No. 672,244. Patented Apr. 16, 1901.
R. S. v. TRAUNFELS.
PIPE JOINT.
(Application filed Oct. 23, 1900.)
(No Model.)

UNITED STATES PATENT OFFICE.

RUDOLF STUMMER v. TRAUNFELS, OF VIENNA, AUSTRIA-HUNGARY.

PIPE-JOINT.

SPECIFICATION forming part of Letters Patent No. 672,244, dated April 16, 1901.

Application filed October 23, 1900. Serial No. 34,036. (No model.)

*To all whom it may concern:*

Be it known that I, RUDOLF STUMMER RITTER VON TRAUNFELS, imperial and royal baurath, officially-authorized civil engineer, and sworn appraiser, a subject of the Emperor of Austria-Hungary, residing at Vienna, Austria-Hungary, (whose post-office address is 8 Hegelgasse, Vienna, in the Empire of Austria-Hungary,) have invented certain new and useful Improvements Relating to Pipe-Joints, of which the following is a specification.

My invention relates to pipe-joints; and its object is to provide for so joining the adjacent ends of flexible pipes as to thereby obtain greater security against the occurrence of leakages and destruction of the joints under the action of high temperature and against other disadvantages very often experienced with the usual methods of joining as heretofore generally used.

My invention therefore consists in the improved method of and means for joining flexible pipes, as more fully hereinafter described, and illustrated in the accompanying drawings, in which—

Figure 1:
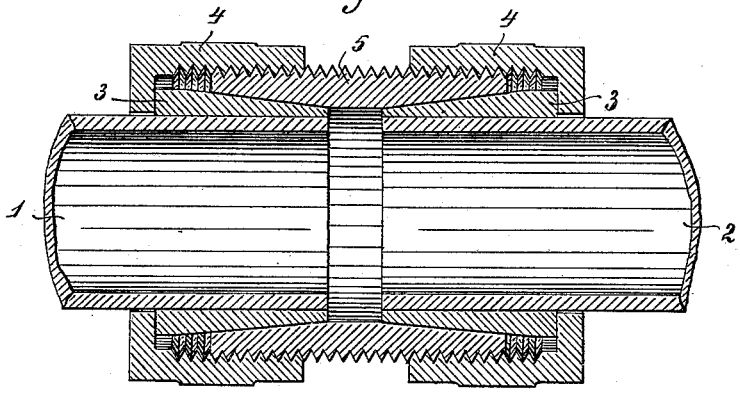
Figure 2:
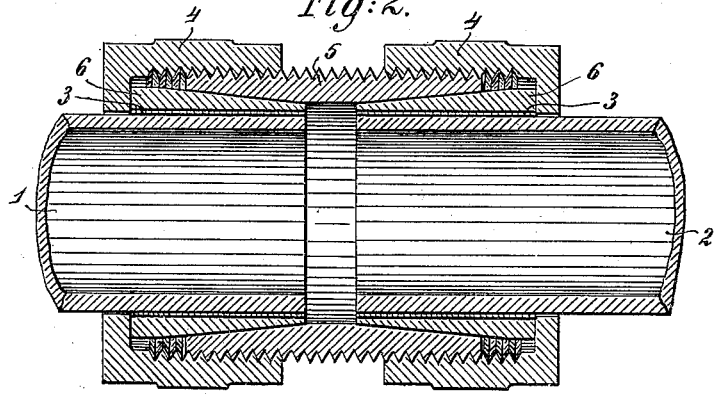
Figure 3:
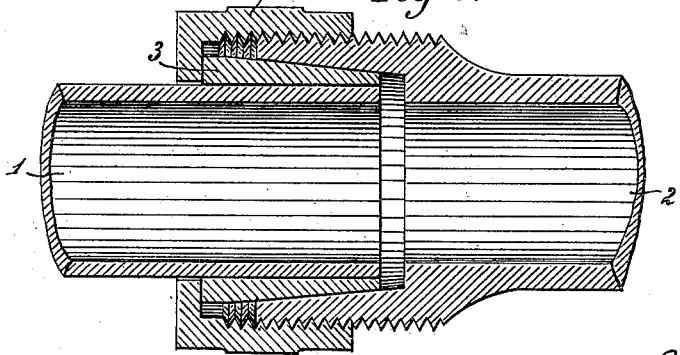

Figure 1 is a central vertical section showing the ends of two flexible metal pipes joined according to my invention. Fig. 2 is a similar section showing a modification, the connecting-cone here being of different construction from that shown in Figs. 1 and 3. Fig. 3 is a similar section illustrating my improvement as applied in the case of the one pipe being already provided with a screw-thread.

One object of my invention is to render the usual intermediate packing material, such as the asbestos generally used for making the joint tight fitting, either entirely dispensable or to maintain the same fully intact. To this end I provide either the end of the one pipe, as in Fig. 3, or each end of the two pipes to be connected, as in Figs. 1 and 2, with a surrounding metallic cone 3, preferably made of copper, the conical surface thereof constituting the joining-surface and the annular end surface forming the abutment for the threaded nut 4 or joining medium proper.

It having been found by experience that none of the methods heretofore employed for securing the cone 3 to the end of a pipe have been sufficiently reliable and that even brazing of these parts utterly fails under the temperatures which are sometimes required, I according to my invention connect the said parts by forming the cone 3 on the end of the pipe by electrodeposition about one-sixth or one-fifth of an inch thick, and in order to obtain a deposit of sufficiently fine-grained structure and to avoid its assuming a spongy or porous condition I use a current of correspondingly low tension. Upon completion of the metallic deposit the same is given the desired conical, or in some cases cylindrical, shape by turning, whereupon the joint is then completed either by means of the nut already previously applied or by means of the two-sectional nut 4, as illustrated in Figs. 1 and 2.

If one of the pipes has its end not yet provided with a screw-thread corresponding with the inner thread of the nut 4, as assumed in Fig. 3 of the drawings, then I form cones 3 on the ends of both pipes, such as shown in Figs. 1 and 2, and I employ an auxiliary double cone 5, having the threads for the nut 4.

What I claim as my invention, and desire to secure by Letters Patent, is—

The method of joining the ends of flexible metallic pipes which consists in forming a sufficiently thick outer layer of metal at the end of the pipe and integral therewith by electrodeposition, then working down such layer to the proper size and shape and connecting the ends of the pipes by means of nuts with or without auxiliary cones, substantially as and for the purpose described.

In testimony whereof I have hereunto set my hand in presence of two subscribing witnesses.

RUDOLF STUMMER v. TRAUNFELS.

Witnesses:
   C. B. HURST,
   ALVESTO S. HOGUE.